United States Patent Office.

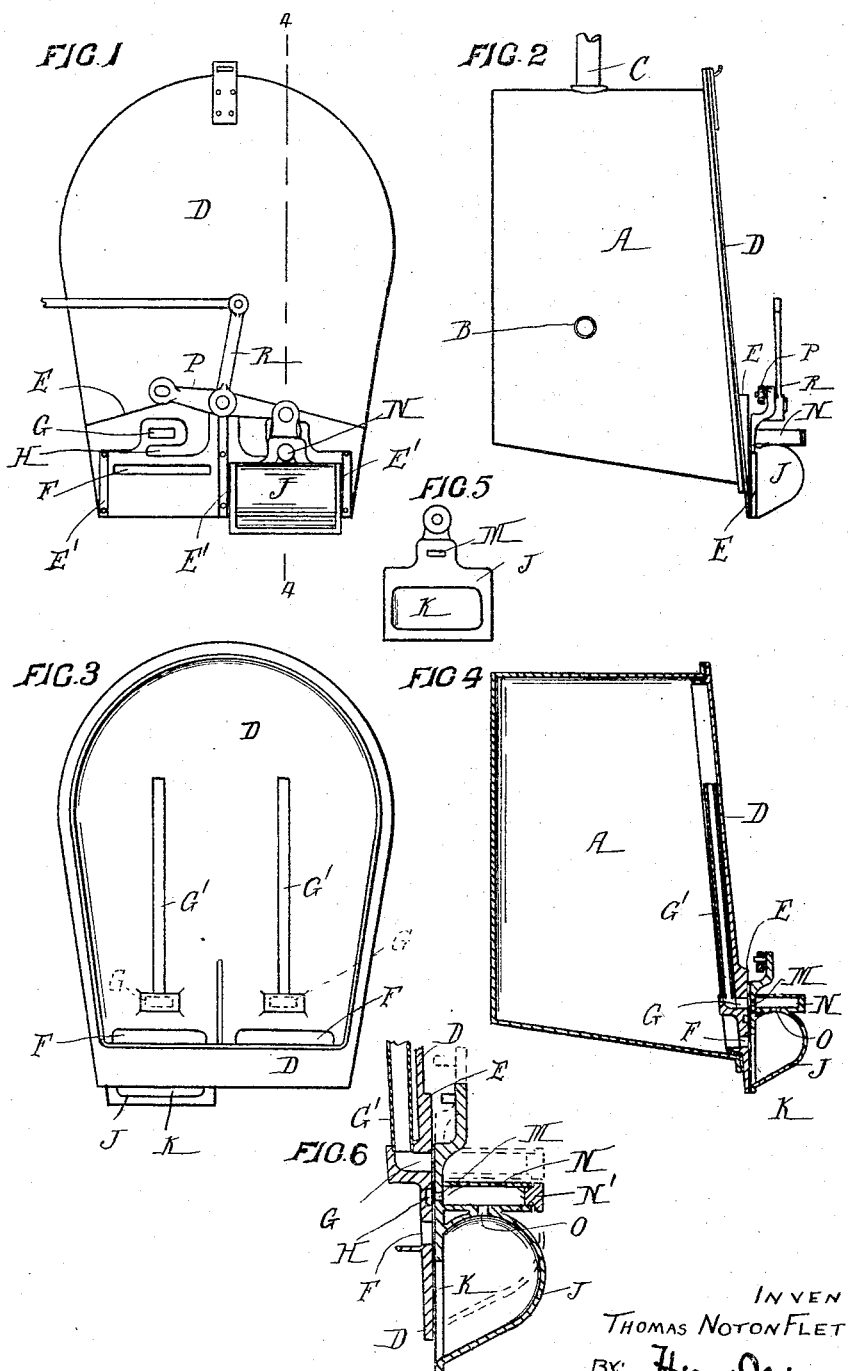

THOMAS NOTON FLETCHER, OF HAMILTON, NEW ZEALAND.

COMBINED MILKING-MACHINE RELEASER AND PULSATOR.

1,194,989.  Specification of Letters Patent.  Patented Aug. 15, 1916.

Application filed December 8, 1915. Serial No. 65,709.

*To all whom it may concern:*

Be it known that I, THOMAS NOTON FLETCHER, subject of the King of Great Britain, residing at Hamilton, Auckland, New Zealand, have invented a new and useful Improved Combined Milking-Machine Releaser and Pulsator; and I do hereby declare the following to be a full, clear, and exact description of the same.

This invention relates to an improved construction of the apparatus employed in milking machine installations for the purpose of releasing or delivering the milk drawn into a receiving tank by the action of the vacuum, and delivering it into a can or other receptacle without interfering with the continuous working of the plant. The apparatus is also so constructed that it may, in addition, be used as a pulsator to operate the teat cups of the machine in the well known manner.

The construction of apparatus employed is of that class in which a discharging vessel is caused to move reciprocally over a flat face formed in the end of a milk receiving chamber and in its reciprocation at one end of its movement, to make connection between the two vessels so that the milk in the receiver will flow into the discharging vessel, and at the other limit of its movement, to cut off such connection and to open the discharging vessel to the atmosphere so that the milk that has passed into it, may flow therefrom into the desired receptacle.

The present invention has been devised in order to provide a construction such that the respective connections of the discharging vessel with the vacuum in the receiving chamber and with the atmosphere shall be effected through a passage or passages distinct from the milk inflow into the discharging vessel and its outflow therefrom, thereby obviating any liability of the milk being mixed with air and the consequent liability to foam or churn prevalent in this class of releaser at present in use.

The object of the invention is attained by providing the valve face of the receiving chamber with two ports, one of which is the milk port and the other the vacuum port and which latter is connected by a pipe with the receiver at a point well above the normal milk level. Midway between these ports is a groove leading sidewise and open at its end to the atmosphere. The inside face of the discharging vessel is also formed with two ports one of which leads through its side while the other leads away from its top end. The former of these ports, in the reciprocation of the vessel, is adapted to alternately connect with the milk port of the receiver and to open below the bottom edge of such receiver, while the latter of these ports alternately communicates with the vacuum port of the receiver and the air groove. In the former position the discharging vessel is thus in communication with the vacuum and the milk ports so that the air is exhausted therefrom and milk flows from the receiver into it, while in the latter position, it is in communication with the atmosphere at its top and its bottom is open so that the milk flows away therefrom in the desired manner.

The upper port of the discharging vessel is so constructed that it may, if desired, be connected with other apparatus, as for instance, the teat cups of the machine, so that in the reciprocation of the vessel, such apparatus will be alternately connected with air and vacuum and thereby pulsated.

In the accompanying drawings, I have shown the preferred manner of carrying out the invention, by which two discharging vessels are arranged to work in alternation with one another, but it will be readily understood that only one vessel may be used if so desired, the operation being the same in both instances.

In such drawings: Figure 1 is a front elevation of the releaser, one of the discharging vessels being removed to show the ports in the receiver end. Fig. 2 is a side elevation thereof. Fig. 3 is a back elevation of the receiver end. Fig. 4 is a sectional side elevation taken on the line 4—4 of Fig. 1. Fig. 5 is a back elevation of one of the discharging vessels. Fig. 6 is a sectional detail, on an enlarged scale, illustrating the working of the discharging vessel.

A is the receiving vessel which is connected in the usual manner with the milk main B and vacuum pipe C so that the milk from the main flows into such vessel. The front removable end or cover D of the vessel is formed with a flat valve face E having two sets of ports arranged side by side thereon. Each set comprises a milk port F and a vacuum port G, with an air groove H between them. The milk port E opens through the front on a level with the bottom of the receiver, so that the milk will be free to gravitate through such port, the bottom of the receiver preferably sloping downward to its front end, as shown in the drawings. The vacuum port G is positioned above the milk port a suitable distance and it opens through the receiver front and into a pipe G' that extends upward inside the receiver to a point above the normal level of the milk collecting therein. The vacuum port is therefore free from any liability of being choked with milk. The air groove H is made to extend sidewise in from the edge of the valve face E as shown in Fig. 1 and is positioned between the ports F and G.

J is the discharging vessel the inside face of which is made flat so as to make a close airtight connection with the valve face E against which it fits and moves between guides E'. Such inner face is formed with the milk port K opening into the inside of the vessel and with the port M opening into the tube N extending across the top of the vessel and having an aperture O connecting it therewith. These ports K and M are so positioned with regard to each other that when the vessel is raised to its top limit of movement, the milk port K will coincide with the milk port F of the receiver while the port M coincides with the vacuum port G and the bottom edge of the port K lies against a solid part of the valve face E, as shown in Fig. 4 and in the dotted lines in Fig. 6. When the vessel is at the lowest point of its movement the port K is cut off from the port F of the receiver and its bottom edge extends below the bottom edge of the valve face, while the port M is cut off from the vacuum port G and lowered into coincidence with the air groove H, as shown by the full lines in Fig. 6. Thus when the vessel J is raised, the air within it is exhausted through the aperture O, tube N and vacuum port G, passing upward through the vacuum main C so that the milk will gravitate from the receiver through the ports F and K into the vessel J. When this vessel is lowered, the milk within it will be first confined by the cut off from the port F and then released by the admission of air through the air groove H, tube N and aperture O into the top of the vessel and the lowering of the lip or edge of the port K below the edge of the valve face E, the milk thus flowing out into a receptacle placed beneath.

The discharging vessel may be reciprocally moved by any approved means. When two vessels are used they may be suspended upon the respectively opposite ends of a rocking lever P pivoted to the top of the valve face and caused to rock by the lever R receiving reciprocal motion from any convenient source.

The outer end of the tube N may be closed by a screw plug N' which, when removed, will permit of such tube being connected with any apparatus that requires to be pulsated or alternately supplied with air and exhausted of air, so that in the reciprocal movements of the vessel J, such apparatus will be alternately connected with the atmosphere through the air groove H and with the vacuum within the receiver A through the port G and tube G'.

I claim:—

1. In a releaser of the class herein described a receiving vessel, a discharging vessel mounted and reciprocating upon said receiving vessel, a connection entering the upper end of the discharging vessel and the discharging vessel having an opening adapted to alternately connect with the receiving vessel and the outside, such opening being positioned below the vacuum and air connection, substantially as and for the purposes specified.

2. An apparatus of the class herein described, comprising a reciprocally moving discharging vessel and a milk receiver upon which such vessel is mounted, the milk receiver being constructed with a milk port near its bottom and with a vacuum port connected to a point in the receiver near its top, and also with an air groove on its outside face positioned between such ports, and the discharging vessel being constructed with an inside surface adapted to move over the ports of the receiver and which surface is provided with a lower milk port adapted at one limit of the vessel's travel to coincide with the milk port of the receiver and at the other limit of its movement to be uncovered, and with an upper vacuum-air port adapted at the first limit of movement of the vessel to coincide with the vacuum port of the receiver and at the other limit of such movement to coincide with the air groove in the receiver's surface, substantially as and for the purposes specified.

3. Apparatus for the purposes herein described consisting in the combination with a milk receiver connected respectively with a milk main and with a vacuum source, of a cover for such receiver constructed with a valve face on its outer surface which valve face is formed with a milk port near its bottom end, with a vacuum port and with an air groove positioned between such ports, and a discharging vessel mounted to reciprocate on such valve face and formed on its inner face with a lower milk port adapted on the movements of the vessel to alternately connect with the milk port of the receiver and to be uncovered, and with an upper vacuum air port adapted in the vessel's movement to alternately connect with the vacuum port of the receiver and the air groove therein, such vacuum air port communicating with a tube that is also in communication with the upper part of the discharging vessel, substantially as specified.

In testimony whereof, I have signed this specification in the presence of two subscribing witnesses.

THOMAS NOTON FLETCHER.

Witnesses:
EDA MERTIE SMITH,
ETHEL FRANCES COURTNEY.

Copies of this patent may be obtained for five cents each, by addressing the "Commissioner of Patents, Washington, D. C."